United States Patent [19]

Hangarter et al.

[11] Patent Number: 4,667,614
[45] Date of Patent: May 26, 1987

[54] ADJUSTMENT AND INDICATING DEVICE FOR AN ELECTRONIC SEWING MACHINE

[75] Inventors: Otto Hangarter, Engen, Fed. Rep. of Germany; Otmar Stillhard, Steckborn, Switzerland

[73] Assignee: Fritz Gegauf AG Bernina-Nähmaschinenfabrik, Steckborn, Switzerland

[21] Appl. No.: 765,814

[22] Filed: Aug. 15, 1985

[30] Foreign Application Priority Data

Aug. 31, 1984 [CH] Switzerland .............. 4172/84

[51] Int. Cl.$^4$ .................. D05B 3/02; D05B 79/00
[52] U.S. Cl. .................................................. 112/445
[58] Field of Search ............. 112/445, 444, 456, 458, 112/453, 121.11; 250/233; 340/722

[56] References Cited

U.S. PATENT DOCUMENTS

| | | | |
|---|---|---|---|
| 3,902,063 | 8/1975 | Oelsch et al. ................ | 250/233 |
| 4,280,423 | 7/1981 | Goncharko .................. | 112/445 |
| 4,341,170 | 7/1982 | Beckerman et al. ........... | 112/445 |
| 4,399,352 | 8/1983 | Ueda ........................ | 340/722 X |

Primary Examiner—Peter Nerbun
Attorney, Agent, or Firm—Marmorek, Guttman & Rubenstein

[57] ABSTRACT

For the adjustment of the values for the length and width of the stitches there is provided rotative adjustment knobs, each of which permitting to set a counter through an incremental sensing device. The state of the counter serves for controlling the machine and an analog display consisting of a luminous beam. From a storage unit basic adjustment values for determined sorts of stitches may be introduced in the counter and utilized unchanged or arbitrarily modified for controlling the display. The adjusted value effective for controlling the machine and the basic adjustment value are displayed in a different manner on each display. This gives as a whole a diversified, pleasant to handle and clear adjustment and display.

16 Claims, 5 Drawing Figures

4,667,614

ADJUSTMENT AND INDICATING DEVICE FOR AN ELECTRONIC SEWING MACHINE

BACKGROUND OF THE INVENTION

The present invention relates to an adjustment and indicating device for at least one parameter, more particularly the length or the width of the stitches at an electronic sewing machine, with digital storage means for one or more parameters, control means and indicating means for controlling the sewing operation, respectively for indicating the one or more parameters in accordance with stored values. Known adjustment and indicating devices of this kind are not satisfactory because on the one hand they do not permit a simple, clear understandable adjustment and on the other hand they do not guarantee an easy readable and interpretable indication. Finally, the possibilities of changing predetermined adjustment values are either missing or limited.

In a known adjustment and indicating device, pairs of keys designated by + and − are provided for the adjustment of the length and the width of the stitches, whereby the corresponding actuation permits the adjusted value to be increased or decreased. The adjusted value is indicated by numerals (DE-PS 32 35 121). As already mentioned, such an adjustment and indicating device is very simple but its handling is rather complicated and its utilization is not particularly pleasant. The practice shows that more particularly the housewifes who make use of the sewing machine only at long time intervals find difficulties to master the modern electronic so that they must again and over again look in the directions for use. Nothing reminds them no longer of the adjustment devices and of the corresponding integrated indicators of the usual, mechanical sewing machines. Not only the adjustment of the machine gives rise to difficulties but also the not well accepted digital indication of the adjusted values. Analog displays are at first sight easier to understand and they can be better compared with a possible nominal or basic value than the digital displays. Preprogrammed adjustments of basic values are no longer present when the operator changes these basic values in order to achieve optimal sewing conditions. The basic values are however still contained in a storage unit of the machine but the operator has no longer any reference about the amount of a determined basic value and consequently about the actual difference from the latter.

SUMMARY OF THE INVENTION

It is an object of the present invention to simplify and improve the adjustability, to improve the indication and to enlarge the possibilities of adjustment, that is as a whole to considerably improve the pleasantness of the handling. To solve this problem, the adjustment and indicating device according to the invention comprises at least one adjustment member movable in a clearly understandable manner in the direction of increasing or decreasing value, said adjustment member being coupled with a converter delivering to an associated storage unit digital signals corresponding to the adjustment operation and indicating means on which the stored value of the parameter is simultaneously electro-optically displayed in analog form, such that as a whole the manual adjustment is simplified by means of the analog display. The existing adjustment members can be moved in a way similar to the one of an usual, mechanical sewing machine, more particularly adjustment knobs can be rotated whereby the rotation of the knob is preferably achieved without any stop in either direction of actuation for permiting adjustments and corrections in either direction and in either extend to be performed. In accordance to claim 2, the converter is preferably an incremental sensing device the rotation of which in one or the other direction corresponding each time to a variation of the stored digital parameter of an amount and in a direction which is determined by the angle of rotation, respectively the direction of rotation of the corresponding adjustment member. It is essential for the adjustment of the machine that the content of the storage unit is continuously displayed.

Claim 3 describes a preferred solution having by itself and also in connection with the first solution particular advantages. The analog display imparts at all time a clear image of the adjustment which has been achieved and in which direction and extent it should possibly be changed. This indication offers the possibility to display in different ways two values at the same time, e.g. the value of a basic adjustment which is stored in the machine and the real, effective adjusted value. The luminous beam may for example continuously extend up to the effective adjusted value and the basic value from the storage unit may simultaneously be indicated by blinking. This provide all the time a clear general view in which direction and extent the effective adjustment differs from a recommended basic value.

A third solution according to claim 7 is in close connection with the second solution. This permits all the time to execute a determined sewing operation, e.g. a festoon stitch either with the recommended values contained in the storage unit of the machine or with any different values.

The invention will be described further by way of example and with reference to the accompanying drawings.

DESCRIPTION OF THE PREFERRED EMBODIMENTS

Figure 1:
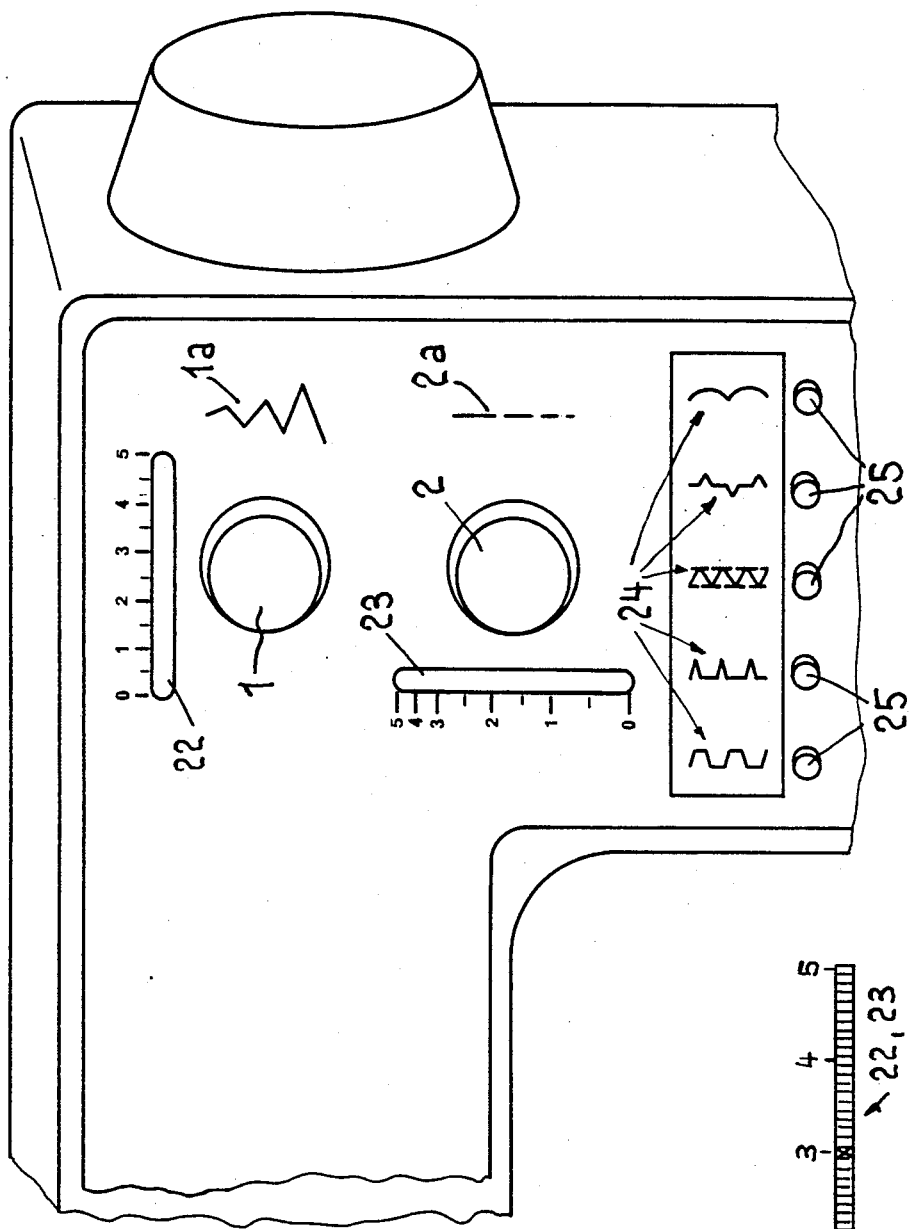
FIG. 1 is a partial view of the sewing machine with the adjustment and indicating elements essential for the understanding of the invention.
Figure 4:
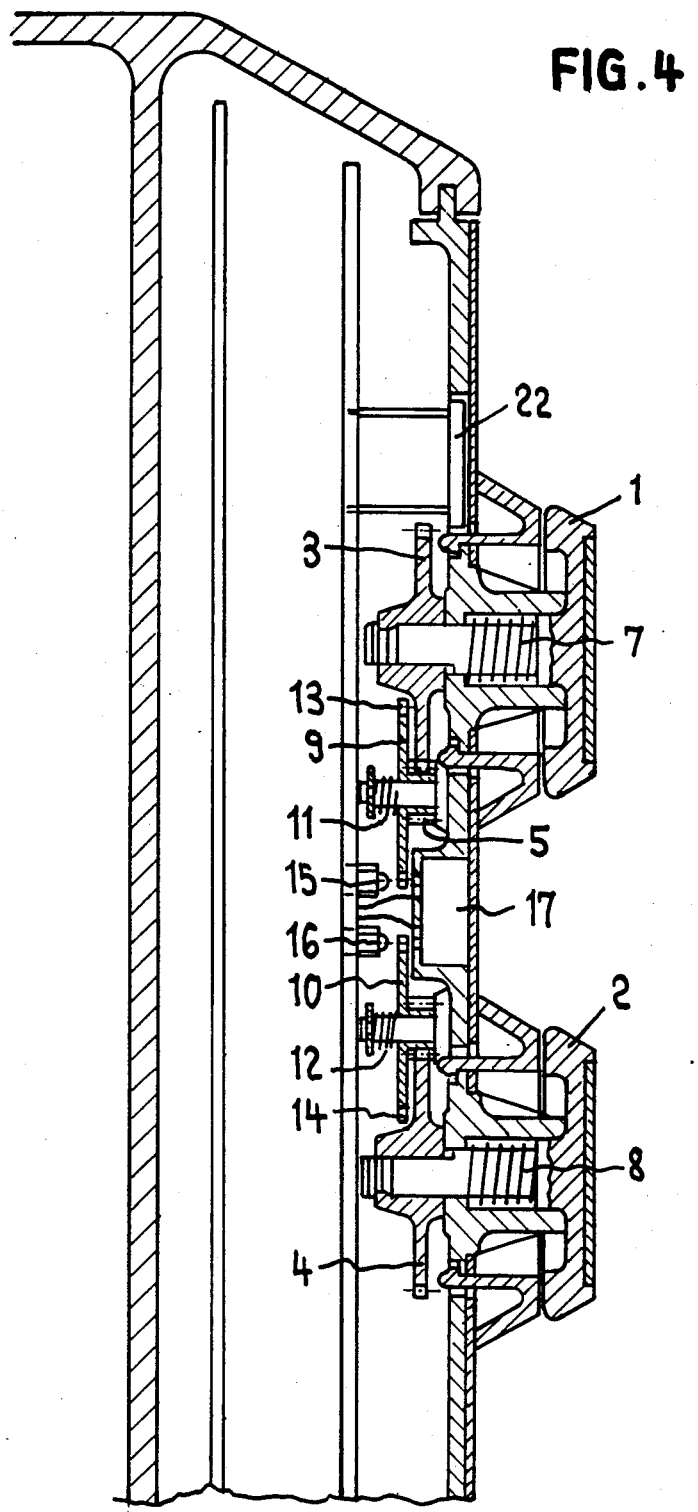
FIG. 4 shows a vertical section across the adjustment device.

FIG. 1 shows at the usual places of a sewing machine rotary adjustment knobs 1, 2 to which are associated the symbols 1a, respectively 2a for the width and the length of the stitches. As shown in FIG. 4, these adjustment knobs 1 and 2 are rotatively mounted in the front part of the machine and they may be turned in either direction without any stop. On the shaft of the adjustment knobs 1 and 2 is fitted a gear 3, respectively 4 which meshes with a pinion 5, respectively 6. Springs 7, respectively 8 cause an adequate axial pressure producing an adequate friction on the hub of the gears 3 and 4 on the front side of the bearing, such that the adjustment knobs may be turned only against an adequate friction causing them to stay firmly in the position attained. The pinions 5 and 6 are each integral with a disk 9, respectively 10 on which is also acting a pressure spring 11, respectively 12 determining not only their axial position but also a determined adequate friction causing the disks 9 and 10 to stay in the position attained at the time. The disks 9 and 10 comprise at the edge a toothing or boring 13, respectively 14 in the vicinity and opposite to which is arranged an appropriate light source 15, respectively 16. On the other side of the disk is provided an incremental sensing device 17 associated to both disks. During the rotation of the disks 9 and 10, optical inputs of the sensing device 17 are alternately liberated and covered. As indicated in FIG. 2, each input of the sensing device 17 comprises two adjacent sensors 18 arranged at such a mutual distance that it appears at the output of the sensing device 17 a pair of phase shifted rectangular signals for each disk 9, respectively 10, which pair of signals is transformed within a detector 19 into a signal of direction v/r (forward-backward) at an output 20 and into a series of pulses at an output 21.

An indicating element 22 arranged in the horizontal direction is provided over the adjustment knob 1 for indicating in a clear, understandable manner the width of the stitches and on the side of the adjustment knob 2 is arranged in the vertical direction an indicating element 23 for indicating in a clear, understandable manner the length of the stitches. Both indicating elements are realized in form of luminous beams by means of a row of light emitting diodes, e.g. of 51 light emitting diodes. To each of those is associated a scale which is linear in the case of the width of the stitches and compressed toward the range of the great values in the case of the length of the stitches. Small lengths of stitches may therefore be adjusted and read off with a greater precision than great lengths of stitches for which a high precision is no longer required. Beneath the previously described adjustment and indicating elements, symbols 24 are shown for different stitch patterns which may be selected by means of push-buttons 25. Beneath these indicating fields and selector keys are indicated further, not designated keys with signal lamps.

Figure 2:
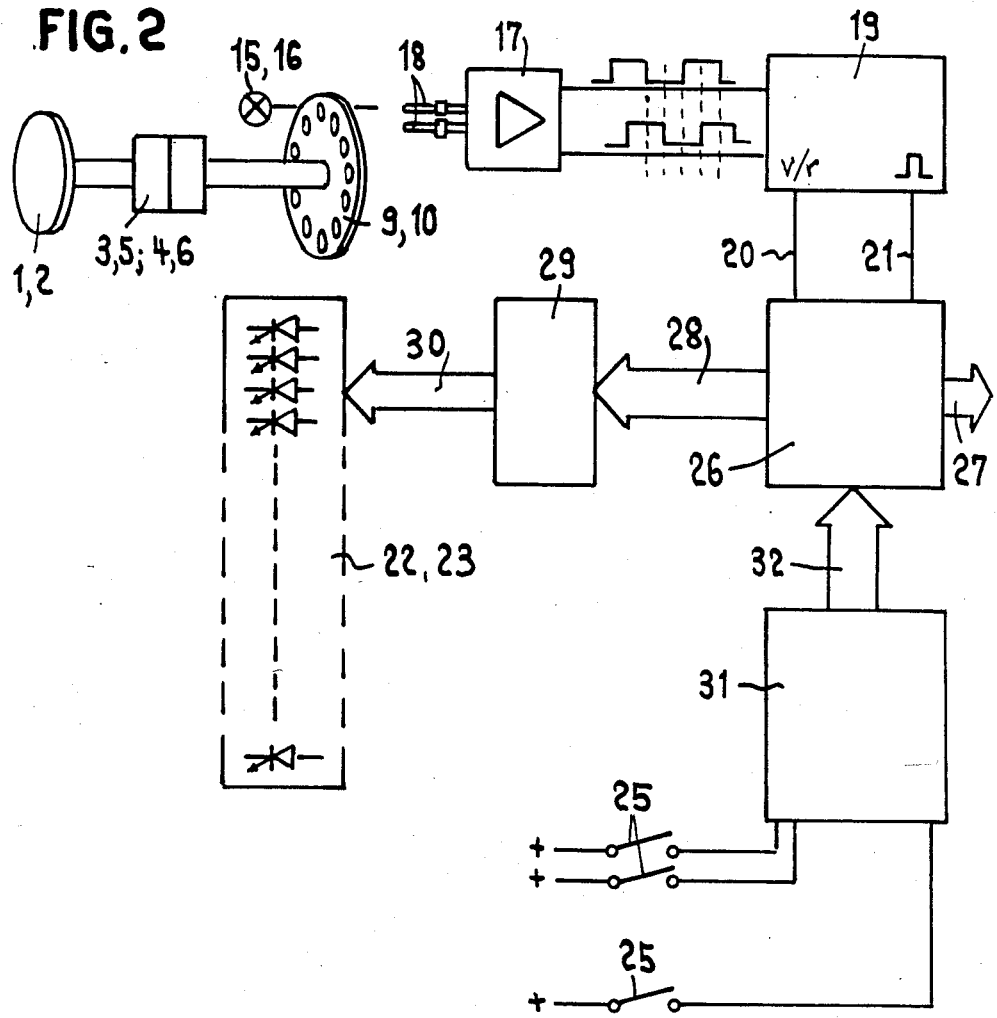
FIG. 2 shows a circuit diagram of the electronic equipment.
Figure 3:
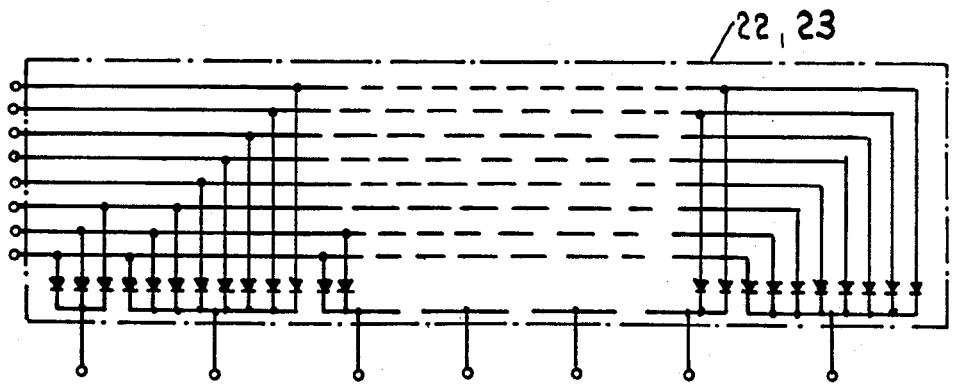
FIG. 3 shows the circuit of a display element.

In FIG. 2, the gear consisting of the wheels 3, 5 and 4, 6 between each of the adjustment knobs 1 or 2 and the associated disk 9, respectively 10 is purely schematically illustrated. The outputs 20 and 21 of the detector 19 are connected to the inputs of a bidirectional counter 26 the state of which being effective in each case for a determined adjustment, respectively a mode of operation of the machine which means that the length, respectively the width of the stitches are controlled in accordance with the state of the counter in a usual manner for electronic controlled sewing machines and that the display is also controlled by the state of the counter. FIG. 2 shows basically only the equipment required for one value to be adjusted and displayed but in the case of two values there is provided for each one of the latter same devices operating in the same manner, starting from the adjustment knobs 1 or 2 up to the control and display devices. The counter 26 comprises outputs 27 for the mentioned control of the length and the width of the stitches in the machine. Further outputs 28 are connected to a decoder and multiplexer 29 the outputs 30 of which are connected to the display 22, respectively 23. The device comprises for each value a storage unit 31 the outputs of which are connected to the counter 26. The selector switches 25 which are illustrated fully schematically in FIG. 2 and which serve each to select a determined sort of stitch are connected to inputs of the storage unit 31 in which a basic adjustment value is associated to each of the sorts of stitches. When a determined sort of stitch is preselected, this basic value is recalled from the storage unit 31 and delivered by the outputs 32 to the counter 26. In order to limit the number of outputs 30, the 51 diodes of each display device 22, 23 are arranged in a matrix according to FIG. 3 the construction and operating mode of which is well known.

The illustrated adjustment and indicating device operates as follows: For preparing a not preprogrammed sewing operation, the length and width of the stitches must be adjusted. According whether the counter 26 goes to zero after each switching out of the machine or remains in the previous state, the adjustment starts from zero or from the previous state when the knobs 1 and 2 are turned. As explained, the rotation of each knob has the effect to deliver a series of pulses and a signal of direction through the associated channel to the associated counter 26 so that the content of the counter is increased or decreased. The state of the counter is at all time indicated by the displays 22 or 23, whereby in accordance with FIG. 5, all of the light emitting diodes corresponding to the state of the counter are activated. The length of the luminous beam gives therefore a clear, simple and easy understandable representation of the value of the actual adjustment obtained as well as of the correctness of the direction of correction. In accordance with the multiplexing operation, groups of each eight light emitting diodes of the display are alternatively fed and activated, the frequency being so choosen that the diodes appear to be continuously activated. When the right state of the counter is attained for the desired length and width of the stitches, the counters 26 remain in the corresponding state and they control the machine during the following sewing operation by the signals at the outputs 27.

Figure 5:
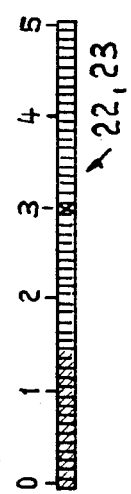
FIG. 5 shows a display element at greater scale.

When selecting a determined sort of stitches by means of one of the switches 25, respectively by repeated actuation of determined switches, each storage unit delivers a basic value for the length, respectively the width of the stitches to the associated counter 26 and these counters are set from their previous state or from zero to this basic value. At the same time, this basic value is delivered through the decoder and multiplexer 29 to the associated display 22 or 23 in such a way that only the light emitting diode which corresponds to the numeral of the basic value is activated. This diode, e.g. the 30th diode, is designated by a cross in FIG. 5 in order to identify this sort of display. The feeding is such that this diode is blinking thus indicating that the displayed value is the recommended or standard value delivered by the storage unit and which corresponds to the selected sort of stitches. By means of the adjustment knobs 1 and 2, it is possible however to select an adjustment of the value which differs from the basic adjustment, by turning the knobs in the desired sense of rotation. This modified adjustment is indicated on the associated display 22, respectively 23 by the number of diodes which are continuously activated, this number corresponding to the adjusted value. The basic value is continuously delivered to the decoder and multiplexer 29 and the circuit is such that the particular diode corresponding to the basic value is periodically interrupted, which causes this diode to blink. In FIG. 5 is shown that e.g. the diodes 1 to 14 are continuously activated while the diode 30 corresponding to the basic value is blinking, this diode 30 being marked out by a cross. For the transmission of the basic value to the decoder and multiplexer 29, the lines 32 may be either connected to the decoder and multiplexer 29 or the counter 26 may comprise two counting units, one of which remaining each time continuously in a state corresponding to the basic value while a second counting unit contains the purposely selected, respectively modified value which is effective for the control of the length, respectively the width of the stitches. By the selection of a determined sort of stitch, the basic value is delivered by the storage unit 31 to the first counting unit, stored therewith and held at disposal for the display unit and the same basic value is transferred in the second counting unit. If no modification of the basic value take place, this same basic value is utilized for the control of the machine and the display unit.

Different variants of execution are possible. Other values like the thread tension, the pressure of the presser foot or similar could likewise be introduced, stored and displayed whereby also basic values of these parameters for determined sorts of stitches could be provided. It would also be possible to provide slides instead of the adjustment knobs, these slides permitting by means of corresponding gears and adapted incremental sensing devices to introduce or modify the adjustment values. Due to the fact that the decoder and multiplexer 29 must be designed for a particularly complicated program in order to control one and the same display unit with different sorts of indications, it could be preferable to utilize a microcomputer which would perform all the functions of the parts 19, 26, 29 and 31 of the device. Other, appropriate converters instead of incremental sensing devices could also be provided.

We claim:

1. Apparatus for adjusting and displaying at least one stitching parameter of an electronic sewing machine, comprising,
   digital storage means for storing a basic value of said parameter,
   at least one manually movable adjustment member for adjusting upward or downward said stored basic parameter value,
   analog to digital converter means responsive to movements of said adjustment member and for converting said movement into a first digital signal indicating whether the basic parameter value is to be adjusted upward or downward and a second digital signal providing count pulses in accordance with the magnitude of the adjustment of the basic parameter value, and
   display means for electro-optically displaying the adjusted parameter value in analog form said display means displaying both the basic parameter value and the adjusted parameter value.

2. Apparatus according to claim 1, wherein said display means comprises a plurality of light emitting elements.

3. Apparatus according to claim 1, wherein said adjustment member is a rotating adjustment member coupled to a disk having peripheral teeth or holes, said disk rotating in front of light sensitive elements.

4. Apparatus according to claim 3, wherein said rotating adjustment member is adapted to be rotated in any arbitrary angular position without any stop.

5. A device according to claim 3, wherein a transmission gear is provided between said rotating adjustment member and said disk.

6. A device according to claim 1, whereby said storage means stores basic parameter values of stitch patterns adapted to be selected.

7. The device of claim 1 wherein said storage means and said converter means are implemented at least in part using a micro-computer.

8. Apparatus for adjusting and displaying at least one stitching parameter of an electronic sewing machine comprising,
   digital storage means for storing a basic value of said parameter,
   at least one manually movable adjustment member for adjusting upward or downward said stored basic parameter value,
   converter means responsive to movements of said adjustment member and for converting said movement into a first digital signal indicating whether the basic parameter value is to be adjusted upward or downward and a second digital signal providing count pulses in accordance with the magnitude of the adjustment of the basic parameter value, and
   electro-optic display means for displaying simultaneously the basic value and the adjusted value of the parameter.

9. A device according to claim 8, wherein said basic parameter value is indicated by blinking of a light.

10. A device according to claim 8, wherein said adjusted parameter value is displayed by causing a corresponding number of elements to emit light and said basic parameter value is displayed by a blinking element arranged at a place corresponding to said basic parameter value.

11. A device according to claim 7, wherein the individual light emitting elements are electrically connected into a matrix.

12. Apparatus for adjusting and displaying stitching parameters of an electronic sewing machine comprising;
    digital storage means for storing basic values of said parameters,
    an up-down counter,
    switch means for causing one or more selected basic parameter values to be entered into said counter
    manually movable adjustment means for adjusting upward or downward said one or more selected basic parameter values,
    converter means responsive to movement of said adjustment member for providing digital signals to said counter indicating whether said one or more selected basic parameter values are to be adjusted upward or downward and counting pulses corresponding to the magnitude of adjustments of said one or more selected basic parameter values, and
    electro-optic display means controlled by said counter for displaying both the basic parameter value and the adjusted parameter value.

13. The apparatus of claim 12 wherein said manually adjustable member comprises a knob adapted to turn a disk having openings adjacent its edge for alternately blocking and transmitting radiation as the disk is turned.

14. The apparatus of claim 13 wherein said converter comprises a pair of sensors, each capable of detecting said alternately blocked and transmitted radiation to produce a pair of signals phase shifted relative to one another, and a detector for detecting the phase shifted signals and for producing said upwards or downwards indicating signals and said counting pulses.

15. The apparatus of claim 8 wherein said adjustment member comprises a knob adapted to turn a disk having openings adjacent its edge for alternately blocking and transmitting radiation as the disk is turned, said converter comprises a pair of sensors each capable of detecting said alternatively blocked and transmitted radiation to produce a pair of phase shifted signals; and a detector for detecting the phase shifted signals and for producing said first and second digital signals.

16. Apparatus for adjusting and displaying at least one stitching parameter of an electronic sewing machine, comprising;

storage means for storing a basic value of said parameter, a manually movable adjustment member for adjusting upward or downward the basic parameter value, including a knob adapted to turn a disk having openings adjacent its edge for alternately blocking and transmitting radiation as the disk is turned, converter means responsive to said alternately blocked and transmitted radiation for providing signals indicating whether the parameter is to be adjusted upward or downward and the magnitude of the adjustment, and, electro-optic display means for displaying both the basic parameter value and the adjusted parameter value.

* * * * *